March 24, 1964  S. N. SMALL  3,125,918
APPARATUS FOR FEEDING AND CUTTING ELONGATED WORKPIECES
Filed Feb. 13, 1959
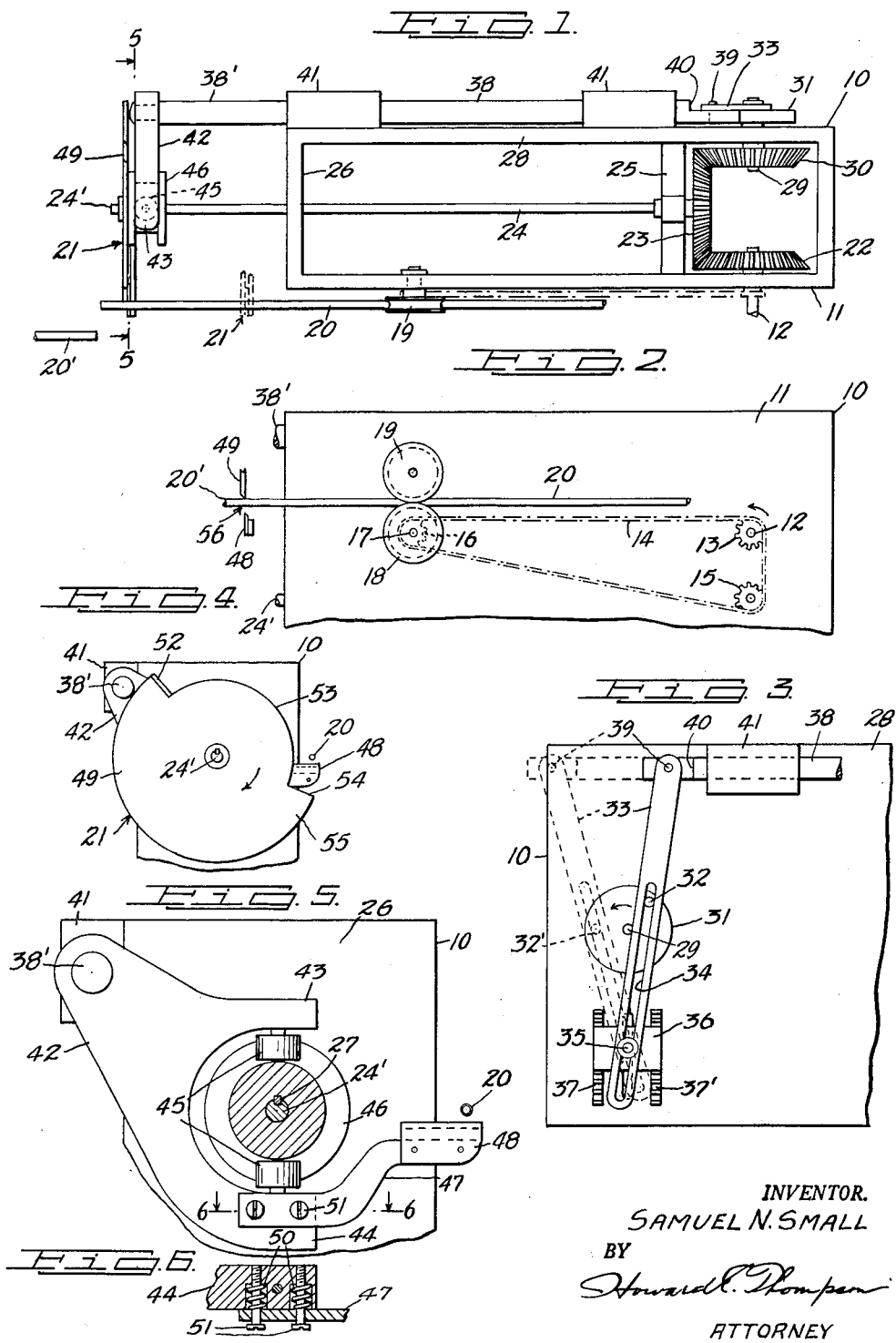
INVENTOR.
SAMUEL N. SMALL
BY
Howard E. Thompson
ATTORNEY

United States Patent Office 3,125,918
Patented Mar. 24, 1964

3,125,918
APPARATUS FOR FEEDING AND CUTTING
ELONGATED WORKPIECES
Samuel N. Small, Valley Stream, N.Y., assignor to
Julius Duberstein, New York, N.Y.
Filed Feb. 13, 1959, Ser. No. 793,191
4 Claims. (Cl. 83—150)

This invention deals with the cutting of elongated fed workpieces, such, for example, as straws or straw wrappers. More particularly, the invention deals with a method and apparatus, wherein the workpiece is fed through the apparatus and a rotary blade or other cutter intermittently moves with and in the path of the workpiece in the cutting operation and is utilized as a means for feeding or advancing the workpiece to the predetermined station.

Still more particularly, the invention deals with a method and apparatus of the character described, wherein a combined fast and slow motion is transmitted to the rotating cutter in each cycle of operation thereof.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic plan view of an apparatus illustrating the cutter at the beginning of one of its operative positions longitudinally with respect to the workpiece and indicating the limit of movement of the cutter partially in dotted lines.

FIG. 2 is a side view of part of the structure shown in FIG. 1, with parts broken away and indicating, in part, the position of the cutter as noted in dotted lines in FIG. 1.

FIG. 3 is a rear view of a part of the apparatus, as shown in FIG. 1, and illustrating in dotted lines the position of the cutter feed mechanism when the cutter assumes the full line position illustrated in FIG. 2.

FIG. 4 is an end view of part of the apparatus, as shown in FIG. 1, omitting background showing, with the rotating cutter blade substantially in the position of FIG. 1.

FIG. 5 is an enlarged sectional detail on the line 5—5 of FIG. 1, omitting part of the background showing; and FIG. 6 is a sectional detail view on the line 6—6 of FIG. 5.

To illustrate my improved method and apparatus, I have diagrammatically shown in FIG. 1 of the drawing a plan view of a frame or casing 10, in the front wall 11 of which is mounted a drive shaft 12, having suitable driving means, which is not shown.

On the shaft 12, outwardly of the wall 11, is a drive sprocket 13, over which passes a drive chain, illustrated by dot-dash lines at 14, the chain passing over an idler sprocket 15 directly beneath the sprocket 13 and around a sprocket 16 on a stub shaft 17. Fixed to the shaft 17 is a grooved workpiece feed pulley 18. A companion pulley 19 is arranged directly above the pulley 18 and, between these pulleys, a workpiece 20 is adapted to be fed at a predetermined speed. The workpiece 20 can be in the form of any type of elongated tube or strand of any desired material.

By way of illustrating one adapation and use of my invention, the workpiece 20 can be regarded as a tubular casing, adapted to be utilized as a wrapper for elongated straws. A substantially endless workpiece is fed into and through the machine and is cut into predetermined lengths by a reciprocating cutter head 21, later described in detail.

Mounted on the shaft 12, within the casing 10 is a bevelled gear 22 which meshes with a gear 23 on a driven shaft 24 extending longitudinally of the casing, the shaft having a suitable bearing support at 25 within the casing. The shaft 24 protrudes through the end wall 26 of the casing, as seen at 24', and the cutter head is keyed to and slidable longitudinally of the end 24', as indicated most clearly at 27 in FIG. 5 of the drawing.

Mounted in the rear wall 28 of the casing is a shaft 29, on which is mounted another bevelled gear 30 driven by the gear 23 and fixed to the shaft 29, outwardly of the wall 28, is a drive crank 31 having, adjacent its periphery, a drive pin 32. Note FIG. 3 of the drawing.

An elongated drive link or rod 33 has an elongated slot 34, in which the pin 32 operates. Also operating in the slot 34 is an adjustable pivot pin 35 supported on a block 36.

The block 36 has, at its sides, teeth, which are not shown, that operatively engage a pair of racks 37, 37' fixed to the rear wall 28 in fixing the position of the plate 36 and the pivot 35 in changing the throw or movement of the upper end of the rod 33. The upper end of the rod 33 is pivoted to a sliding rod 38, as seen at 39, the end of the rod 38 being cut away, as seen at 40. Note FIG. 1 of the drawing.

The rod 38 is mounted in and operates in spaced bearings 41 on the back wall 28 of the casing, the rod having a protruding end 38' extending beyond the wall 26 and fixed to the end 38' is a yoke-shaped member 42, the forked ends 43 and 44 of which support, on adjacent surfaces, antifriction bearings, as at 45, operating in a channelled clutch portion 46 of the head 21 for movement of the head 21 back and forth longitudinally with respect to the workpiece 20.

Supported upon the forked end 44 is an offset arm 47 having, at its free end, a fixed cutter blade 48, this construction being all clearly noted in FIG. 5 of the drawing. In mentioning "fixed," the blade 48 has a definite position with respect to the workpiece 20. However, it moves longitudinally of and with the workpiece in the movement of the head 21 and, further, has a yieldable movement toward the circular or disc rotatable cutter 49. This yieldable movement is contributed to the arm 47 by springs 50 mounted upon the screws 51, which support the arm in connection with the end 44, as diagrammatically illustrated in FIG. 6 of the drawing. In this figure, the arm 47, or the cutter 48, is assumed to be in proper engagement with the adjacent surface of the disc cutter 49.

The cutter 49 is driven by the shaft 24 or its protruding end 24'. The cutter 49 has a radially arranged cutter blade 52 disposed at one end of a cutaway portion 53 on the blade. The other end of the cutaway portion terminates, as at 54. Thus, the large diameter of the disc 49, between 52 and 54 and designated by the reference character 55, may be said to comprise the product feeding or moving portion of the blade, the function and operation of which will be understood from the following description.

It will be apparent that, as the workpiece 20 is fed through the machine at a predetermined speed, the cutter blade 49 is actuated through the mechanism provided at a predetermined speed consistent with the feed of the workpiece 20 so that, upon completing a cutting operation on the workpiece at the position of the cutter, as noted at 56, in part, in FIG. 2 of the drawing, the workpiece will be cut and then simultaneously the head 21 will be fed along with the feed of the workpiece at the speed of feed of the workpiece, during which operation, the then cut product end 20' of the workpiece will be fed by the feed section 55 of the disc 49 until the head 21 reaches the limit of its outward movement; whereupon, the head 21 is fed back to the position indicated at 56 in FIG. 2. The beginning of this backward feed is indicated in FIGS. 1 and 3 of the drawing and, by virtue of the distance between 32 and 35, as noted in FIG. 3, it will be apparent that this backward feed will be much faster than the normal controlled outward feed of the head which would be the feed transmitted to the head when the pin 32 moves from the position indicated at 32' in dotted lines in FIG. 3 to a position at 180° thereto.

During this last named cycle of operation, it will be apparent that the pin 32 is closer to the pivot pin 35; thus, the feed would be slower than the aforesaid return feed of the head 21. Synchronization between the workpiece feed and feed of the head 21 can be regulated by adjustment of the pivot 35 in the rod 33, as previously described.

It will be apparent that the length of the fixed cutter 48 is such as to maintain a surface of the disc 49 in constant engagement with the cutter 48, so as to provide a desirable shearing action of the cutters in performing a clear, clean cut of the workpiece at the spaced intervals during the feed of the elongated workpiece through the machine or apparatus.

It will be understood that, after the head 21 has reached the limit of its travel in synchronism with the feed of the workpiece, the end 54 of the cutter will move out of the path of the workpiece and, simultaneously, the cut product, as at 20' in FIG. 1, will be automatically moved out of alinement with the fed workpiece and the reduced diameter portion of the cutter 49, as at 53, will clear the workpiece as it is being advanced outwardly in its constant feed, until such time as the cutter blade 52 again cuts or shears the workpiece; whereupon, the operation of feeding the cut product 21 will continue, as previously stated.

Means will be provided for timely movement of the product 21' out of the path of movement of the workpiece 20 upon reaching the limit of travel of the cutter head and, in fact, slightly in advance thereof, so that the workpiece can be fed directly into a next receiving station for the next successive product to be cut.

Having fully described my invention, what I claim as new and desire to secure by Letters Patent is:

1. An apparatus of the character described comprising a casing, means on the casing for engaging and continuously feeding an elongated workpiece in a feed path alined with the workpiece, a cutter head movably mounted in connection with the casing, said head comprising fixed and rotatable cutters having portions in constant engagement, the rotatable cutter having a circumferentially long large diameter product moving portion, the rotatable cutter having a cutting surface at the leading edge of the product moving portion, which cutting surface cooperates with the fixed cutter, means on the casing for rotating said rotatable cutter in timed relation to said workpiece feed means, means on the casing for actuating the head along said feed path, first, in one direction in synchronism with the feed of the workpiece simultaneously with operation of the rotatable cutter to shear the workpiece in forming a product which is fed by the product moving portion of the rotatable cutter through the major portion of said first feed stroke of the head, said third named means then actuating the head in a reverse direction to said first directional movement preparatory to the next shearing and product moving operation, said rotatable cutter having a circumferentially long portion clearing the workpiece in the second named directional movement of the head, and the rotatable cutter being mounted on an axis axially fixed with respect to the path of feed of the workpiece.

2. An apparatus as defined in claim 1, wherein said head actuating means includes means for increasing the speed of operation of the head in the second named movement thereof.

3. An apparatus as defined in claim 1, wherein the means for actuating said head comprises a rod connected to the head and slidably mounted on said casing, a crank actuated link directly coupled with said rod, and a pivot on the casing for said link spaced with respect to said crank and on which the link is slidably mounted.

4. An apparatus as defined in claim 3, wherein means is employed adjusting said pivot on the casing to vary movement of the link in controlling extent of movement of the head in both directions.

References Cited in the file of this patent

UNITED STATES PATENTS

| | | |
|---|---|---|
| 576,124 | Hume | Feb. 2, 1897 |
| 1,143,285 | Koella | June 15, 1915 |
| 1,297,203 | McGunigal | Mar. 11, 1919 |
| 1,417,609 | Koerner | May 30, 1922 |
| 1,518,151 | Kennedy | Dec. 9, 1924 |
| 1,591,069 | Witte | July 6, 1926 |
| 1,605,816 | Dietrich | Nov. 2, 1926 |
| 1,963,902 | Hires | June 19, 1934 |
| 2,195,535 | Klein | Apr. 2, 1940 |
| 2,410,555 | Stevens | Nov. 5, 1946 |
| 2,454,241 | Wennerberg | Nov. 16, 1948 |
| 2,776,005 | Anthony | Jan. 1, 1957 |
| 2,862,350 | King | Dec. 2, 1958 |
| 2,869,640 | Platt | Jan. 20, 1959 |

FOREIGN PATENTS

| | | |
|---|---|---|
| 473,586 | Germany | Mar. 21, 1929 |